United States Patent [19]

Takao

[11] Patent Number: 5,546,203
[45] Date of Patent: Aug. 13, 1996

[54] LIQUID CRYSTAL DISPLAY HAVING A FRAME WHICH DOES NOT TRANSMIT LIGHT SOURCE HEAT TO THE DISPLAY

[75] Inventor: Yasunori Takao, Kyoto, Japan

[73] Assignee: Sharp Kabushiki Kaisha, Osaka, Japan

[21] Appl. No.: 134,895

[22] Filed: Oct. 13, 1993

[30] Foreign Application Priority Data

Oct. 16, 1992 [JP] Japan .................................. 4-278333

[51] Int. Cl.⁶ .................... F21V 7/04; G02F 1/1333; G02F 1/1335
[52] U.S. Cl. .................. 359/49; 359/83; 362/31
[58] Field of Search ................ 359/48, 49, 50, 359/83; 362/31

[56] References Cited

U.S. PATENT DOCUMENTS

| | | | |
|---|---|---|---|
| 4,748,546 | 5/1988 | Ukrainsky | 362/223 |
| 5,146,354 | 9/1992 | Plesinger | 359/49 |
| 5,317,430 | 5/1994 | Uratani | 359/49 |
| 5,334,993 | 8/1994 | Okajima | 359/49 |

FOREIGN PATENT DOCUMENTS

| | | | |
|---|---|---|---|
| 64-10780 | 1/1989 | Japan . | |
| 64-26775 | 2/1989 | Japan . | |
| 1-219784 | 9/1989 | Japan | 349/48 |
| 3-204618 | 9/1991 | Japan | 349/48 |
| 5-181133 | 7/1993 | Japan | 349/83 |
| 5-224199 | 9/1993 | Japan | 359/83 |
| 5-257139 | 10/1993 | Japan | 349/48 |

*Primary Examiner*—William L. Sikes
*Assistant Examiner*—Ron Trice

[57] ABSTRACT

A liquid crystal display device is provided with a heat releasing means. The heat releasing means is constructed such that a frame for fixing a liquid crystal display board to an illuminating device has a cutout formed in a position corresponding to a light source in order to expose a holding member of the light source for releasing heat. Alternatively, the heat releasing means is constructed by providing a metallic plate in a portion corresponding to the light source. With these means, it is possible to prevent local rise of temperature in the edge portion of the liquid crystal board.

8 Claims, 5 Drawing Sheets

LIQUID CRYSTAL DISPLAY HAVING A FRAME WHICH DOES NOT TRANSMIT LIGHT SOURCE HEAT TO THE DISPLAY

BACKGROUND OF THE INVENTION (1) Field of the Invention

The present invention relates to a liquid crystal display device to be used to realize slim type, i.e., lap-top type and/or notebook type personal computers, word processors etc and relates, in particular, to a liquid crystal display device which can provide an uniform display screen and improve quality of display.

(2) Description of the Prior Art

FIGS. 1 and 2 show an example of conventional back light type liquid crystal display device, which includes a liquid crystal display board X, a back light type illuminator Y, a light source 1 such as of a cold cathode fluorescent tube (CCFT), a light-introducing plate 2 made of a light transmissive material, a plastic chassis 3 and plastic holding members 4a and 4b for holding light source 1. All these elements are formed into a square unit and enclosed by a frame 5 (metallic bezel) made of a metal.

The illuminator used here is called a back light illuminator of side light type, and in allowably the device to be slim.

Meanwhile, in the prior art liquid crystal display, the liquid crystal display board X (liquid crystal panel) and the light source 1 (CCFT, etc.) are enclosed together by the frame 5 (metallic bezel), and no heat-separating measure is provided between the liquid crystal display board X and the illuminator Y. Therefore, heat generated while the light source 1 is being turned on, is transmitted through the frame 5 to the liquid crystal display board X, and/or the heat is confined inside the frame 5 to raise the temperature of the liquid crystal display board X.

Liquid crystal display board X by nature is affected by a slight temperature variation to change its threshold voltage for display. Accordingly, when a temperature difference is generated between the near area and the distant area from the light source 1 of the liquid crystal display board X, this would bring about unevenness in display density and deteriorate quality of display.

There are some proposals in which the influence of heat radiated from the liquid crystal display device is considered. For example, Japanese Utility Model Application Laid-Open Sho 64 No. 10,780 discloses a back lighting equipment for a liquid crystal display device comprising a light source and a reflecting plate wherein heat releasing holes are provided in the reflecting plate and at least one part of the heat releasing holes is covered by a ventilative sheet having a similar color to that of the reflecting plate. On the other hand, Japanese Utility Model Application Laid-Open Sho 64 No. 26,775 proposes a liquid crystal module structure comprising a liquid crystal panel and an illuminator disposed in the backside of the panel, wherein holes or space is provided in the upper screen portion of the illuminator. Nevertheless, either of these proposals uses a direct illuminating type back lighting device, which is different from the side-light type device shown in FIGS. 1 and 2. More clearly, a direct illuminating type device is constructed such that an illuminating light source is disposed on the back side of the liquid crystal panel to directly illuminate the liquid crystal panel with the help of a reflecting plate and/or condenser plate. Accordingly, in a device of this type, the temperature of the liquid crystal panel is liable to rise and it is difficult to make the entire device slim.

SUMMARY OF THE INVENTION

It is therefore an object of the present invention to provide a liquid crystal display device which is capable of preventing heat generated from a light source from being transmitted to a liquid crystal display board, and which can improve the liquid crystal display board in display quality.

The above object of the present invention can be achieved by the following features.

A first aspect of the present invention lies in that a liquid crystal display device comprises: a liquid crystal display board; an illuminating device for illuminating the liquid crystal display board from the back side thereof; and a frame for fixing the liquid crystal display board in front of the illuminating device, and the illuminating device comprises a light-introducing plate disposed on the backside of liquid crystal display board in parallel therewith, a light source disposed adjacent to an end face of the light-introducing plate, a holding member for holding the light source and light-introducing plate, and in that the holding member is made of a material that blocks light, and the frame has a cutout formed in a position corresponding to the light source in order to expose the holding member outside for releasing heat.

In accordance with a second aspect of the present invention, a liquid crystal display device comprises: a liquid crystal display board; an illuminating device for illuminating the liquid crystal display board from the back side thereof; and a frame for fixing the liquid crystal display board in front of the illuminating device, and the illuminating device comprises a light-introducing plate disposed on the backside of liquid crystal display board in parallel therewith, a light source disposed adjacent to an end face of the light-introducing plate, a holding member for holding the light source and light-introducing plate, and the liquid crystal display device is characterized in that the frame has a cutout formed in a position corresponding to the light source for releasing heat and a metallic plate having a high heat conductivity is provided in the cutout without keeping in contact with the frame.

In accordance with a third aspect of the present invention, a liquid crystal display device comprises: a liquid crystal display board; an illuminating device for illuminating the liquid crystal display board from the back side thereof; and a frame for fixing the liquid crystal display board to a display window in front of the illuminating device, and the illuminating device comprising a light-introducing plate disposed on the backside of liquid crystal display board in parallel therewith, a light source disposed adjacent to an end face of the light-introducing plate, a holding member for holding the light source and light-introducing plate, and the liquid crystal display device is characterized in that the frame is disposed inwardly of the display window while keeping away from the holding member, and a metallic plate for releasing heat is provided on the surface of the holding member while the metallic plate is disposed without keeping in contact with the frame.

With the configurations described above, heat generated from the light source for illumination when it is activated, is dissipated via the cutout and/or the metallic plate to the air. Accordingly, the heat in the frame for fixing the liquid crystal display board can be lowered so that the temperature of the liquid crystal display board can be reduced in the vicinity of the light source. Accordingly it is possible to prevent the occurrence of unevenness in display density on the liquid crystal board.

DESCRIPTION OF THE PREFERRED EMBODIMENTS

The present invention will hereinafter be described in detail referring to embodiments.

First Embodiment

Figure 3:
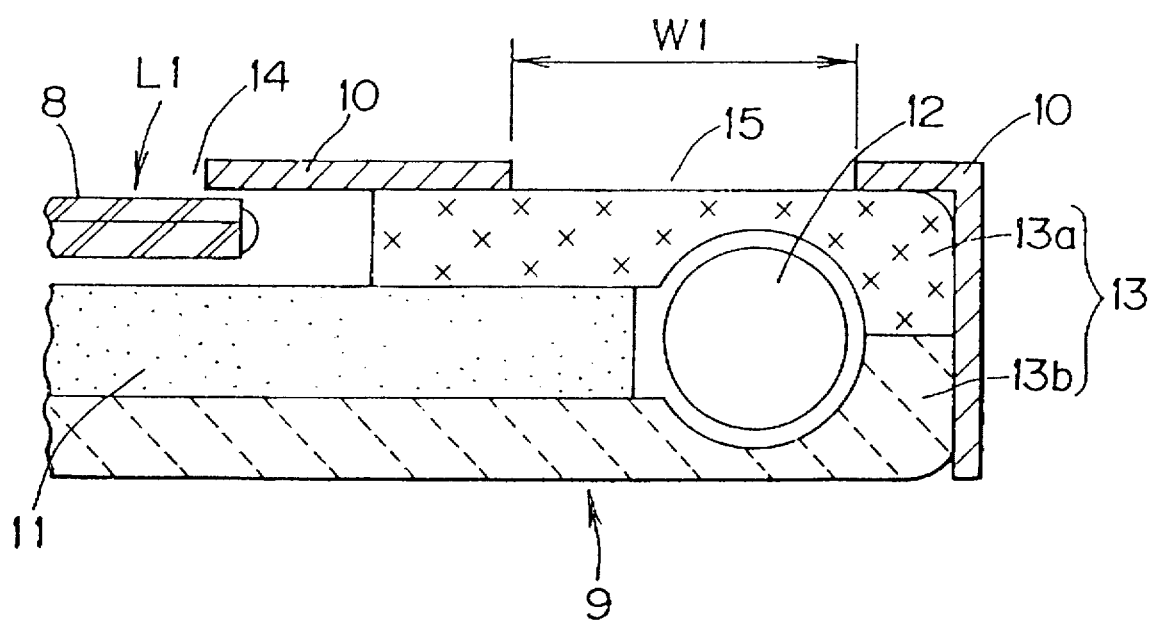
FIG. 3 is a partial sectional view showing a liquid crystal display device in accordance with a first embodiment of the present invention.
Figure 4:
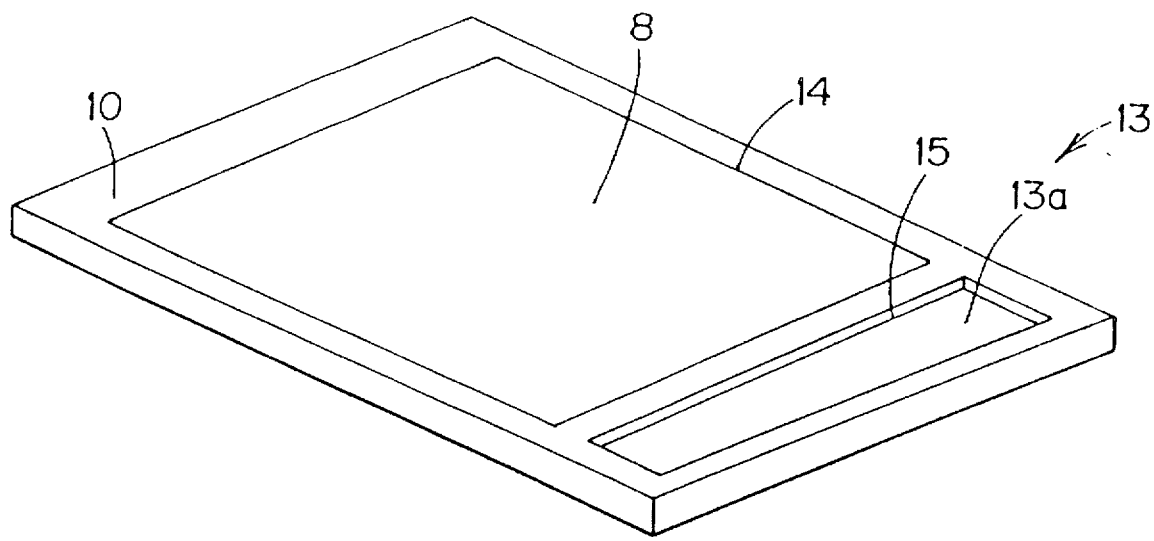
FIG. 4 is a perspective overall view showing a liquid crystal display device in accordance with a first embodiment of the present invention.

A liquid crystal display device in accordance with a first embodiment of the present invention is, as shown in FIGS. 3 and 4, of an edge-light type, and includes a liquid crystal display board 8 (liquid crystal panel), an illuminating device 9 for illuminating the liquid crystal display board 8 from the back side thereof, and a frame 10 (metallic bezel) for fixing the liquid crystal display board 8 in front of illuminating device 9.

The illuminating device 9 is composed of a light-introducing plate 11 disposed on the backside of liquid crystal display board 8 in parallel therewith, a light source 12 disposed adjacent to an end face of the light-introducing plate 11, a holding member 13 (plastic chassis) for holding the light source 12 and light-introducing plate 11.

The holding member 13 is made of a material that blocks light. The frame 10 has a cutout 15 formed in a position corresponding to the light source 12 in order to release heat.

As shown in FIG. 3, the light-introducing plate 11 is a flat plate made of acrylic resin with about 2.0 mm in thickness and having larger length and width than those of a display area L1 of the liquid crystal display board 8.

The light source 12 may use a straight tube type cold cathode fluorescent tube (CCFT) that is constructed by a luminous element such as filament or the like and an enclosing tube thereof and has a diameter of 4.1 mm, a length of 164 mm and a consumption power of 2.0 W, as an example.

The holding member 13 comprises a front holding portion 13a supporting the light source 12 from the front and a rear holding portion 13b supporting the light source 12 from the back side. Both holding portions 13a and 13b are made of a material that blocks light and has a low heat-conductivity such as polycarbonate, ABS resin and etc., and are hermetically put together, with screws fixed at periphery outside where the light source 12 occupies in order to prevent leaking of light from the light source 12. Of the two, the front holding portion 13a is provided over the light-introducing plate 11 but only in a limited region on the side of light source 12. On the other hand, the rear holding portion 13b is disposed entirely over the backside of the light-introducing plate 11 and also serves as a reflection sheet for returning light emitted backward from the inside of the light-introducing plate 11 thereinto.

Figure 5:
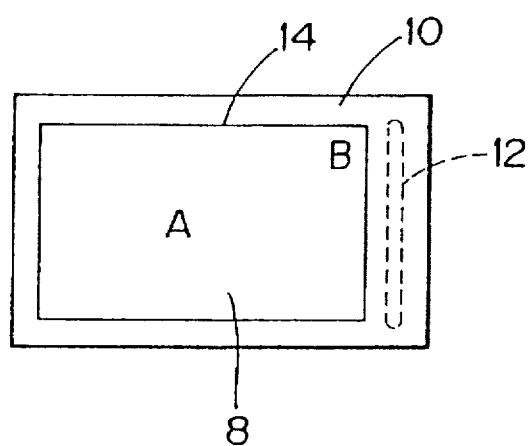
FIG. 5 is a plan view showing a liquid crystal device.

The frame 10 is made from a galvanized sheet iron or the like and provided with a display window 14 having a rectangular shape as shown in FIGS. 3 to 5. The edge portion of the frame 10 on the side of the light source 12 is formed into L-shape in section so as to cover the front side of the front holding portion 13a and the side end of both holding portions 13a and 13b.

A cutout 15 for releasing heat by exposing the holding member 13 is formed on the frame 10 in a position corresponding to the light source 12. The width W1 of the cutout 15 is preferably set two times greater than the diameter (4.1 mm) of the light source in view of the heat distribution created inside the holding member 13.

The other edges of the frame 10 than that on the side of the light source 12 are formed so as to cover the end faces of the light-introducing plate 11 to thereby prevent the ingress of scattering light from the outside. The outside edges of the frame 10 except that on the side of light source 12 are preferably provided with clamping claws (not shown) capable of being bent onto the back side of the rear holding portion 13b so as to prevent the illuminating device from falling out.

In thus constructed liquid crystal display device, light emitted from the light source 12 is incident on the end face of the light-introducing plate 11 to enter the inside thereof. The thus proceeding light is reflected on the rear holding portion 13b so as to illuminate the rear side of the liquid crystal display device 8.

In this while, heat generated from the light source 12 causes the temperature of the holding member 13 to rise. In the present embodiment, however, since the cutout 15 is formed on the frame 10 in the portion corresponding to the light source 12 as shown in FIG. 3, the heat from the light source 12 is not confined inside the frame 10, but will be mostly released through the cutout 15 into the air. Accordingly, the temperature of the holding member 13 falls, which means that the liquid crystal display device 8 decreases in temperature in the vicinity of the holding member 13. As a result, temperature variation in the liquid crystal display device 8 can be reduced so as to prevent the occurrence of unevenness in display density and therefore to be able to improve quality of display.

Specifically, as to the device of the present invention and the prior art apparatus shown in FIGS. 1 and 2, measurement of surface temperature of the liquid crystal display board 8 was made at two points A and B shown in FIG. 5 and defined as follows:

Point A is a point that lies in a central portion apart from the light source 12 and has a relatively low temperature.

Point B is a point that lies in a corner adjacent to the light source 12 for liquid crystal display board 8 and has the highest temperature on the plate.

Each measurement of surface temperature of the liquid crystal display board 8 was taken after the light source 12 had been on for one hour. The result is shown in Table 1. As apparent from Table 1, variation of the temperature of the present embodiment was improved noticeably as compared to that in the prior art. The quality of display was improved such that no unevenness in display density could be found by the visual observation.

In this connection, if the cutout 15 is formed in the frame 10, there could be a fear that light emitted from the light source 12 might dissipate through the cutout 15, but no light loss will occur and almost all light can be lead into the light-introducing plate 11 because the holding member 13 has a light-blocking property as mentioned above. Accordingly, brightness on the illuminated surface can be prevented from deteriorating.

TABLE 1

|  | Current through tube (mA) | Temperature at central portion A (°C.) | Temperature at edge portion B (°C.) | Variation in temperature (°C.) |
|---|---|---|---|---|
| CEx. | 5.0 | 28.4 | 31.7 | 3.3 |
| Ex. 1 | 5.0 | 26.6 | 29.3 | 2.7 |
| CEx. | 6.8 | 28.3 | 32.6 | 4.3 |
| Ex. 1 | 6.8 | 27.5 | 31.0 | 3.5 |

CEx.: Conventional example,
Ex: Example of the present invention

Second Embodiment

Figure 6:
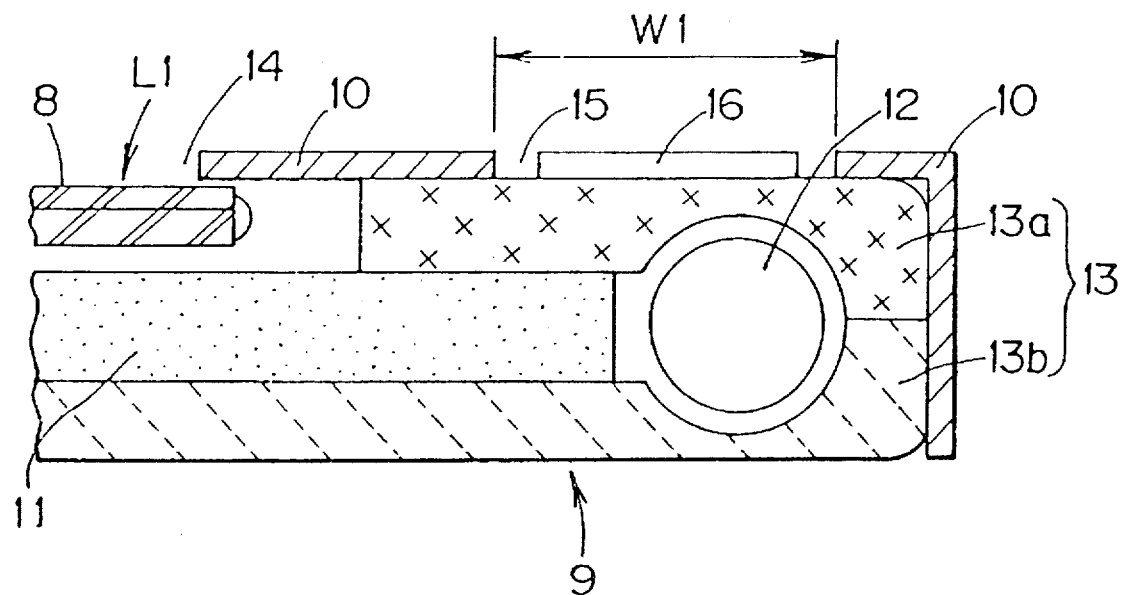
FIG. 6 is a partial sectional view showing a liquid crystal display device in accordance with a second embodiment of the present invention.
Figure 7:
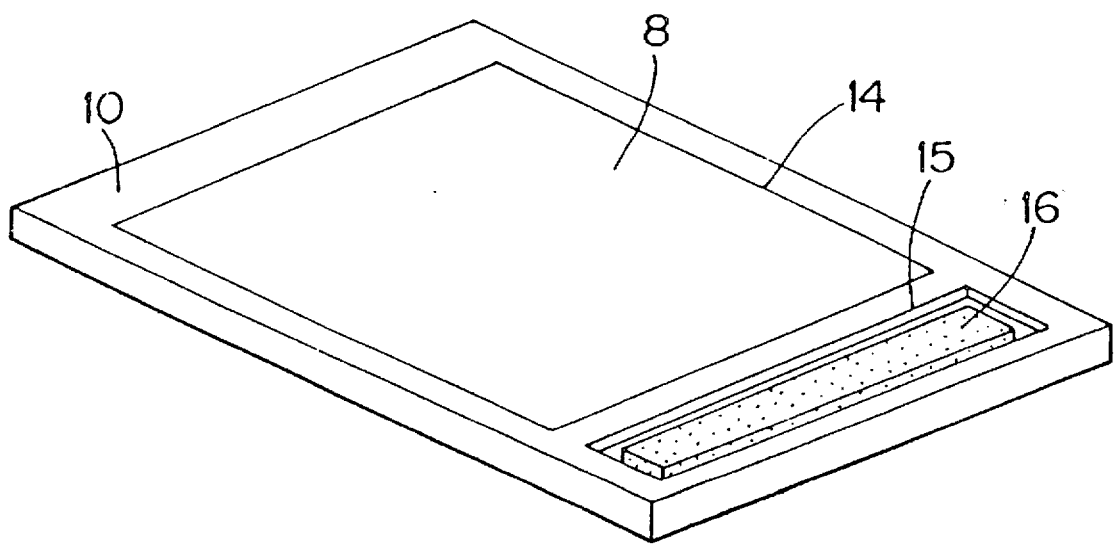
FIG. 7 is a perspective overall view showing a liquid crystal display device in accordance with a second embodiment of the present invention.

A liquid crystal display device in accordance with a second embodiment of the present invention is, as shown in FIGS. 6 and 7, includes a liquid crystal display board 8, an illuminating device 9 for illuminating the liquid crystal display board 8 from the back side thereof, and a frame 10 for fixing the liquid crystal display board 8 in front of illuminating device 9. The illuminating device 9 is composed of a light-introducing plate 11 disposed on the back-side of liquid crystal display board 8 in parallel therewith, a light source 12 disposed adjacent to an end face of the light-introducing plate 11, a holding member 13 for holding the light source 12 and light-introducing plate 11.

A cutout 15 for releasing heat is formed on the frame 10 in a position corresponding to the light source 12. In addition, a metallic plate 16 having a high heat-conductivity is provided in the cutout 15 with keeping space from, or not in contact with the frame 10. In one word, the configuration is similar to that of the first embodiment in that the cutout 15 is formed in the frame 10 in the position corresponding to the light source 12, but is different in that the metallic plate 16 having a high heat-conductivity is provided in the cutout 15 as is shown in FIGS. 6 and 7.

The metallic plate 16 is formed with a typical aluminum plate having an elongate rectangular shape, and intimately attached to the holding member 13 that is exposed in the cutout 15 using an adhesive or any other attaching means. This metallic plate 16 is kept away from the frame 10 in order to establish adiabatic property from the frame 10. The other configurations are the same with those of the first embodiment.

In this arrangement, heat from the light source 12 is absorbed by the metallic plate 16 through the holding member 13. This metallic plate 16 is located in the cutout 15 and is exposed outside, so that almost all the absorbed heat will be released into the air. Accordingly, the temperature of the holding member 13 falls.

Here, since the frame 10 is kept away from the metallic plate 16, the temperature of the frame 10 does not rise as high as that of the metallic plate 16, but is kept as low as that of the holding member 13 having a relatively low temperature. Accordingly, the temperature of the liquid crystal display device 8 in the vicinity of the holding member 13 falls relatively as compared to the metallic plate 16. As a result, temperature variation in the liquid crystal display device 8 can be reduced so as to prevent the occurrence of unevenness in display density and therefore to be able to improve quality of display.

Figure 1:
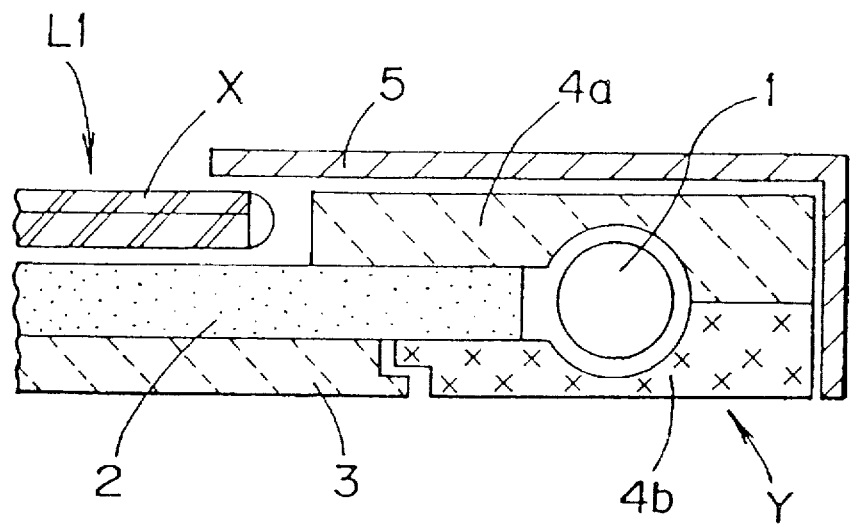
FIG. 1 is a partial sectional view showing a prior art liquid crystal display device.
Figure 2:
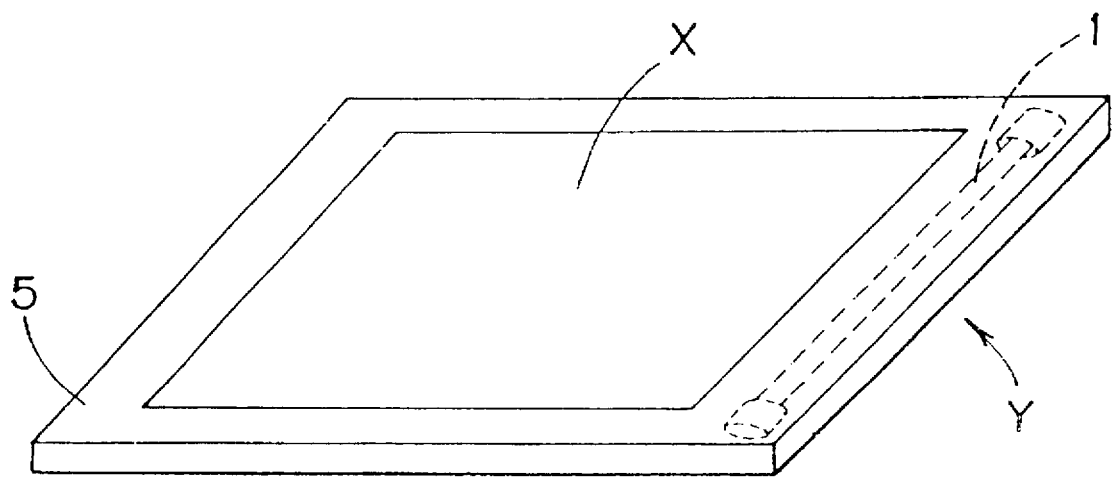
FIG. 2 is a perspective overall view showing a prior art liquid crystal display device.

Specifically, as to the device of the present invention and the prior art apparatus shown in FIGS. 1 and 2, measurement of surface temperature of the liquid crystal display board 8 was made at two points A and B shown in FIG. 5 and defined as in the description of the first embodiment.

Each measurement of surface temperature of the liquid crystal display board 8 was taken after the light source 12 had been on for one hour. The result is shown in Table 2. As apparent from Table 2, variation of the temperature of the present embodiment was improved noticeably as compared to that in the prior art. The quality of display was improved such that no unevenness in display density could be found by the visual observation.

TABLE 2

|  | Current through tube (mA) | Temperature at central portion A (°C.) | Temperature at edge portion B (°C.) | Variation in temperature (°C.) |
|---|---|---|---|---|
| CEx. | 5.0 | 28.4 | 31.7 | 3.3 |
| Ex. 2 | 5.0 | 28.9 | 30.5 | 1.6 |
| CEx. | 6.8 | 28.3 | 32.6 | 4.3 |
| Ex. 2 | 6.8 | 29.2 | 31.5 | 2.3 |

CEx.: Conventional example,
Ex: Example of the present invention

Third Embodiment

Figure 8:
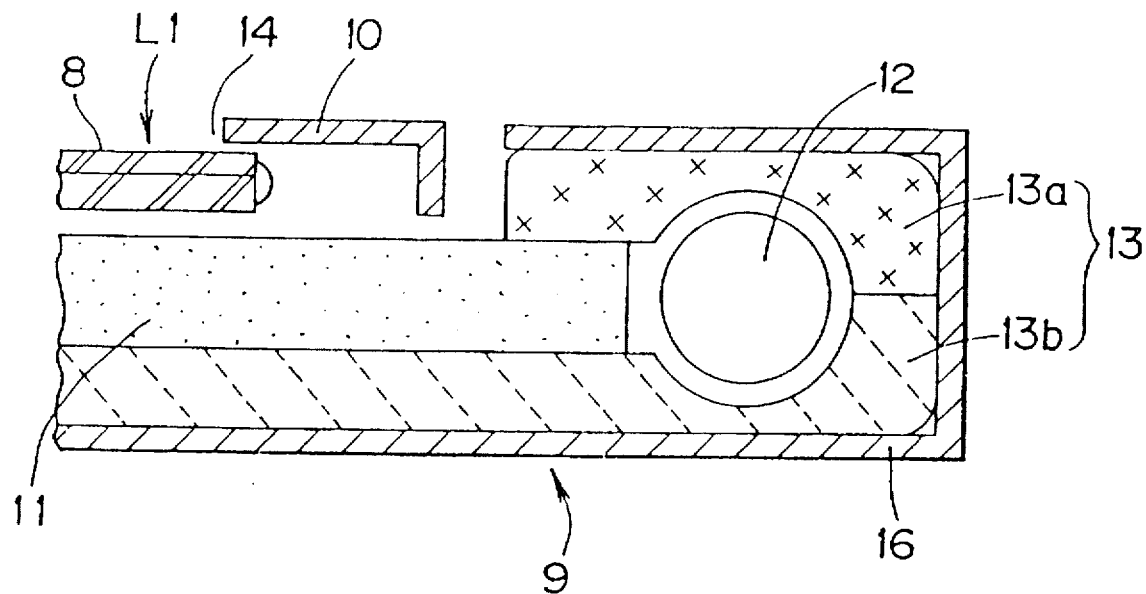
FIG. 8 is a partial sectional view showing a liquid crystal display device in accordance with a third embodiment of the present invention.
Figure 9:
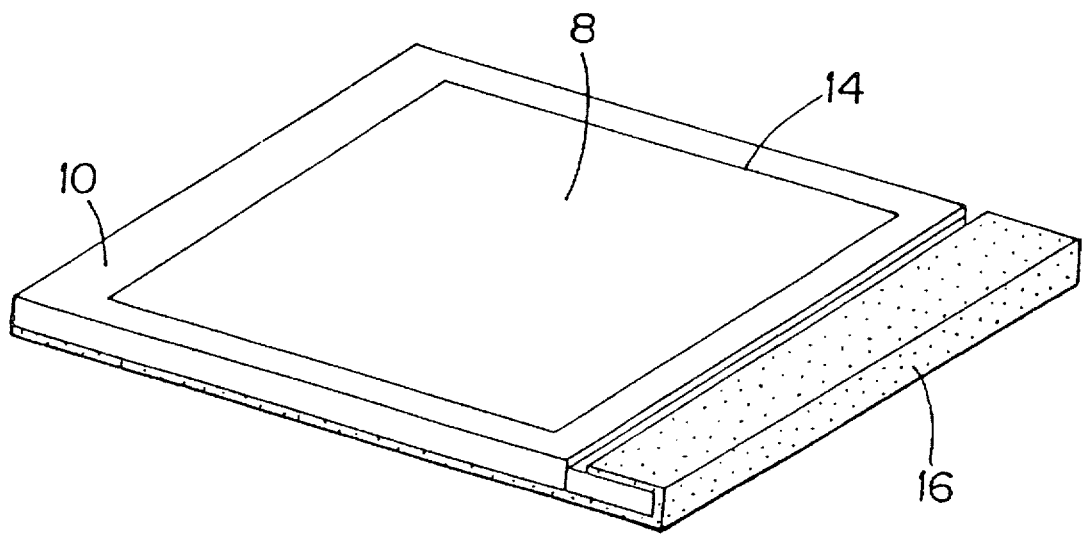
FIG. 9 is a perspective overall view showing a liquid crystal display device in accordance with a third embodiment of the present invention.

A liquid crystal display device in accordance with a third embodiment of the present invention is, as shown in FIGS. 8 and 9, includes a liquid crystal display board 8, an illuminating device 9 for illuminating the liquid crystal display board 8 from the back side thereof, and a frame 10 for fixing the liquid crystal display board 8 to a display window 14 in front of illuminating device 9. The illuminating device 9 is composed of a light-introducing plate 11 disposed on the backside of liquid crystal display board 8 in parallel therewith, a light source 12 disposed adjacent to an end face of the light-introducing plate 11, a holding member 13 for holding the light source 12 and light-introducing plate 11. The frame 10 is disposed inwardly of the display window 14 while keeping away from the holding member 13. Provided on a surface of the holding member 13 is a metallic plate 16 for releasing heat, which is not in contact with the frame 10. Again, the metallic plate 16 for releasing heat is made of the same material as used in the second embodiment such as aluminum, etc., and is disposed on the surface of the holding member 13, more clearly, the front face, side end and rear face of the holding member 13. The metallic plate 16 is kept away from the frame 10 so as not to exchange heat with the frame 10.

In this arrangement, the heat from the light source 12 is absorbed by the metallic plate 16 through the holding member 13. This metallic plate 16 is exposed outside, so that almost all the absorbed heat will be released into the air.

Accordingly, as the temperature of the holding member 13 falls, the temperature of the liquid crystal display device 8 in the vicinity of the holding member 13 falls. As a result, temperature variation in the liquid crystal display device 8 can be reduced so as to prevent the occurrence of unevenness in display density and therefore to be able to improve quality of display.

Specifically, as to the device of the present invention and the prior art apparatus shown in FIGS. 1 and 2, measurement of surface temperature of the liquid crystal display board 8 was made at two points A and B shown in FIG. 5 and defined as in the description of the first embodiment.

Each measurement of surface temperature of the liquid crystal display board 8 was taken after the light source 12 had been on for one hour. The result is shown in Table 3. As apparent from Table 3, variation of the temperature of the present embodiment was improved noticeably as compared to that in the prior art. The quality of display was improved such that no unevenness in display density could be found by the visual observation.

TABLE 3

|  | Current through tube (mA) | Temperature at central portion A (°C.) | Temperature at edge portion B (°C.) | Variation in temperature (°C.) |
| --- | --- | --- | --- | --- |
| CEx. | 5.0 | 28.4 | 31.7 | 3.3 |
| Ex. 2 | 5.0 | 29.0 | 30.2 | 1.2 |
| CEx. | 6.8 | 28.3 | 32.6 | 4.3 |
| Ex. 2 | 6.8 | 28.6 | 30.5 | 1.9 |

CEx.: Conventional example,
Ex: Example of the present invention

It should be understood that the present invention is not limited to the above embodiments, and various changes and modifications can be added to the above embodiment within the scope of the present invention.

For example, although the light source 12 is disposed on one side end of the light-introducing plate 11 in the above embodiments, a pair of light sources can be provided on both side ends, respectively.

As has been apparent from the description heretofore, according to one aspect of the present invention, since the cutout is formed in the frame in a portion corresponding to the light source so as to expose the holding member outside, it is possible to release the heat from the light source outside via the cutout.

In accordance with another aspect of the present invention, there is provided a metallic plate for absorbing and releasing the heat from the light source, it is possible to cause the temperature of the holding member to fall. In this case, the metallic plate is kept away from the frame, so that the heat discharged from the metallic plate can be prevented from being transmitted to the liquid crystal display board.

From the above, it is possible to markedly reduce heat-conductance between the liquid crystal display board and the light source by establishing heat-separation therebetween. Consequently, the present invention exhibits an advantage that unevenness in display density on the liquid crystal display board can be diminished.

What is claimed is:

1. A liquid crystal display device comprising:

a liquid crystal display board;

an illuminating device for illuminating said liquid crystal display board from the backside thereof; and a frame for fixing said liquid crystal display board in front of said illuminating device, said illuminating device comprising a light-introducing plate disposed on the backside of said liquid crystal display board in parallel therewith, a light source disposed adjacent to an end face of said light-introducing plate, and a holding member for holding said light source and said light-introducing plate, wherein said holding member is made of a material that blocks light, and said frame has a cutout formed in a position corresponding to said light source in order to expose said holding member for releasing heat.

2. The liquid crystal display device according to claim 1, wherein said frame encompasses part of said holding member on at least two surfaces.

3. The liquid crystal display device according to claim 1, wherein said frame holds said liquid crystal display board and said holding means.

4. A liquid crystal display device comprising:

a liquid crystal display board;

an illuminating device for illuminating said liquid crystal display board from the backside thereof; and a frame for fixing said liquid crystal display board in front of said illuminating device, said illuminating device comprising a light-introducing plate disposed on the backside of said liquid crystal display board in parallel therewith, a light source disposed adjacent to an end face of said light-introducing plate, and a holding member for holding said light source and said light-introducing plate, wherein said frame has a cutout formed in a position corresponding to said light source for releasing heat and a metallic plate having a high heat conductivity is provided in said cutout without being in contact with said frame.

5. The liquid crystal display device according to claim 4, wherein said metallic plate encompasses part of said holding member on at least two surfaces.

6. The liquid crystal display device according to claim 4, wherein said frame holds both said liquid crystal display board and said holding means.

7. A liquid crystal display device comprising:

a liquid crystal display board;

an illuminating device for illuminating said liquid crystal display board from the backside thereof; and a frame for fixing said liquid crystal display board to a display window in front of said illuminating device, said illuminating device comprising a light-introducing plate disposed on the backside of liquid crystal display board in parallel therewith, a light source disposed adjacent to an end face of said light-introducing plate, and a holding member for holding said light source and said light-introducing plate, wherein said frame is disposed inwardly of said display window while keeping away from said holding member, and a metallic plate for releasing heat is provided on the surface of said holding member while said metallic plate is disposed without being in contact with said frame.

8. The liquid crystal display device according to claim 7, wherein said metallic plate encompasses part of said holding member on at least two surfaces.

* * * * *